United States Patent [19]
Takamiya et al.

[11] Patent Number: 4,920,827
[45] Date of Patent: May 1, 1990

[54] STEPLESS SPEED CHANGE DEVICE

[75] Inventors: Kikuzo Takamiya, Kitamoto; Yoshitaka Tamura, Kitasaitama; Yoichi Shibayama, Ageo; Ritsuo Nishimura, Urawa; Kiyofumi Hirai; Hiromitsu Serizawa, both of Ageo, all of Japan

[73] Assignee: Bridgestone Cycle Co., Ltd., Japan

[21] Appl. No.: 317,181

[22] Filed: Feb. 28, 1989

[30] Foreign Application Priority Data

Mar. 8, 1988 [JP] Japan ................... 63-52505
Mar. 8, 1988 [JP] Japan ................... 63-52506

[51] Int. Cl.$^5$ ...................... F16H 37/06; F16H 15/50; F16H 13/10
[52] U.S. Cl. ..................... 475/166; 74/211; 475/170; 475/215
[58] Field of Search ............... 74/211, 213, 690, 691, 74/796

[56] References Cited

U.S. PATENT DOCUMENTS 3,190,148  6/1965  Flichy ....................... 74/211 X
3,203,278  8/1965  General .................... 74/691 X
4,098,145  7/1978  Dickinson ................ 74/690

FOREIGN PATENT DOCUMENTS

49-29168  8/1974  Japan .
8002729  12/1980  World Int. Prop. O. ........... 74/690

Primary Examiner—Leslie A. Braun
Assistant Examiner—Harold F. Macris
Attorney, Agent, or Firm—Arnold, White & Durkee

[57] ABSTRACT

A stepless speed change device has an input shaft and an output shaft. The device inlcudes a planetary carrier proviced at an inner end of the input shaft, a sun gear provided at an inner end of the output shaft to be in mesh with planet gears carried on the planetary carrier, and an internal gear in mesh with the planet gears to form a planetary gear. The device further includes a driven rotor rotatable about the input shaft and in the form of a hollow cylinder having flanges at both ends and concentrically connected to the internal gear, a driving rotor enclosing the driven rotor and including two members connected to the input shaft on both sides of the driven rotor, and an intermediate friction transmission ring whose eccentricity is adjustable and interposed between the flanges of the driven rotor and between the two members of the driving rotor for transmitting rotating power therebetween.

8 Claims, 12 Drawing Sheets

FIG_6

FIG_10

FIG. 11

FIG_12

STEPLESS SPEED CHANGE DEVICE

BACKGROUND OF THE INVENTION

This invention relates to a stepless speed change device for general purpose suitable for use in industrial machines, transportation facilities and the like.

In general, a speed change device enabling speeds to change stepwise has disadvantages in that shocks occur when the speeds are stepwise changed and optimum speeds are difficult to obtain because intermediate speeds could not be set other than the stepwise determined speeds.

A stepless speed change device eliminates such disadvantages of the speed change device. Mechanical stepless speed change devices have been practically used which are mostly friction wheel type stepless speed change devices. One example is that disclosed in Japanese Utility Model Application Publication No. 49-29,168.

With such a hitherto used friction wheel type device, the stepless speed change is accomplished by stepless changing rotating radii at contacting points of conical wheels for friction transmission. However, the contacting surfaces of the conical wheels are wide belt-like surfaces along contacting orbits corresponding to pitch lines due to Hertz stresses. As a result, positive and negative slips occur on larger and smaller diameter sides of the contacting orbit so that such slips result into internal friction losses to lower the transmission efficiency.

Moreover, when the transmission ratio is maximum or minimum, the positive and negative slips above described are rapidly increased because a ratio of pitch line diameters of the driving and driven friction wheels at friction transmission contacting points is fairly large such as from 1:2 to 1:4. Therefore, the transmission efficiency is considerably decreased in fastest and lowest speed ranges.

SUMMARY OF THE INVENTION

It is a primary object of the invention to provide an improved stepless speed change device which eliminates all the disadvantages of the prior art and which is operated with high efficiency even in speed ranges other than the fastest and lowest speed ranges and simple in construction, easy to manufacture and light and small-sized.

In order to achieve this object, a stepless speed change device having an input shaft and an output shaft according to the invention comprises a planetary carrier provided at an inner end of said input shaft, a sun gear provided at an inner end of said output shaft to be in mesh with planet gears carried on the planetary carrier, and an internal gear in mesh with the planet gears to form a planetary gear, and further comprises a driven rotor rotatable about said input shaft and in the form of a hollow cylinder having flanges at both ends and concentrically connected to said internal gear, a driving rotor enclosing said driven rotor and including two members connected to said input shaft on both sides of said driven rotor, and an intermediate friction transmission ring whose eccentricity is adjustable and interposed between said flanges of the driven rotor and between said two members of the driving rotor for transmitting rotating power therebetween.

In a preferred embodiment of the invention, the eccentricity of the intermediate friction transmission ring is adjusted by an eccentric ring which is fitted in a casing of the device and encircling the intermediate friction transmission ring.

In another embodiment, the eccentricity is adjusted by two sets of guide rollers in contact with the intermediate friction transmission ring.

As above described, according to the invention the intermediate friction transmission ring adjustable in its eccentricity relative to the input shaft is provided between the driving rotor formed by two members and rotatable together with the input shaft and the driven rotor rotatably provided on the input shaft without using conical wheels for friction transmission. The friction transmission is accomplished by the engagements of these members. In the fastest speed ranges, particularly, the driving and driven rotors concentrically contact the intermediate friction transmission ring so that these members are in contact with each other with all circumferences, with the result that very high transmission efficiency approximately 100% can be obtained without slipping.

Moreover, even in speed ranges other than the fastest speed range, where the intermediate friction transmission ring is eccentric to the input shaft so that the driving and driven rotors are partially in contact with the intermediate friction transmission, the ratios of pitch line diameters of the rotors at friction transmission contacting points are nearer 1 (one) than 1:2 in the prior art. Therefore, the friction transmission contacting lines are fairly long on the pitch lines and the positive and negative slip zones are narrower than those in the prior art, so that much higher transmission efficiency can be obtained in speed ranges other than the fastest ranges.

The invention will be more fully understood by referring to the following detailed specification and claims taken in connection with the appended drawings.

DETAILED EXPLANATION OF PREFERRED EMBODIMENTS

FIGS. 1 to 6 illustrating a first embodiment of the invention. In the drawing, the stepless speed change device comprises a casing 1 substantially in the form of a hollow cylinder which is opened on an input side and has a boss 1a on an output side for a shaft passing therethrough. The casing 1 is provided at its bottom portion with a base 2 formed integral with the casing 1 and is covered by a casing cover 3 clamped to the casing 1 by means of bolts 4. The casing cover 3 has a boss 3a on an input side for an input shaft passing therethrough, and a flange 3b for clamping the casing cover 3 to the casing 1.

A guide ring 5 is secured together with the casing cover 3 to the casing 1 by means of the bolt 4. An eccentric ring 6 having an eccentric inner aperture (FIGS. 3 and 4) is slidably provided on an inner circumferential surface of the guide ring 5. A handle 7 is threadedly secured into the eccentric ring 6 from the outside of the casing 1 such that the handle 7 is rotatable about 90° as shown by arrows A and B in FIG. 2. Reference numeral 5a denotes a notch formed in the guide ring 5 for the rotation of the handle 7. Washers 8 and 9 are fitted about the handle 7.

Figure 1:
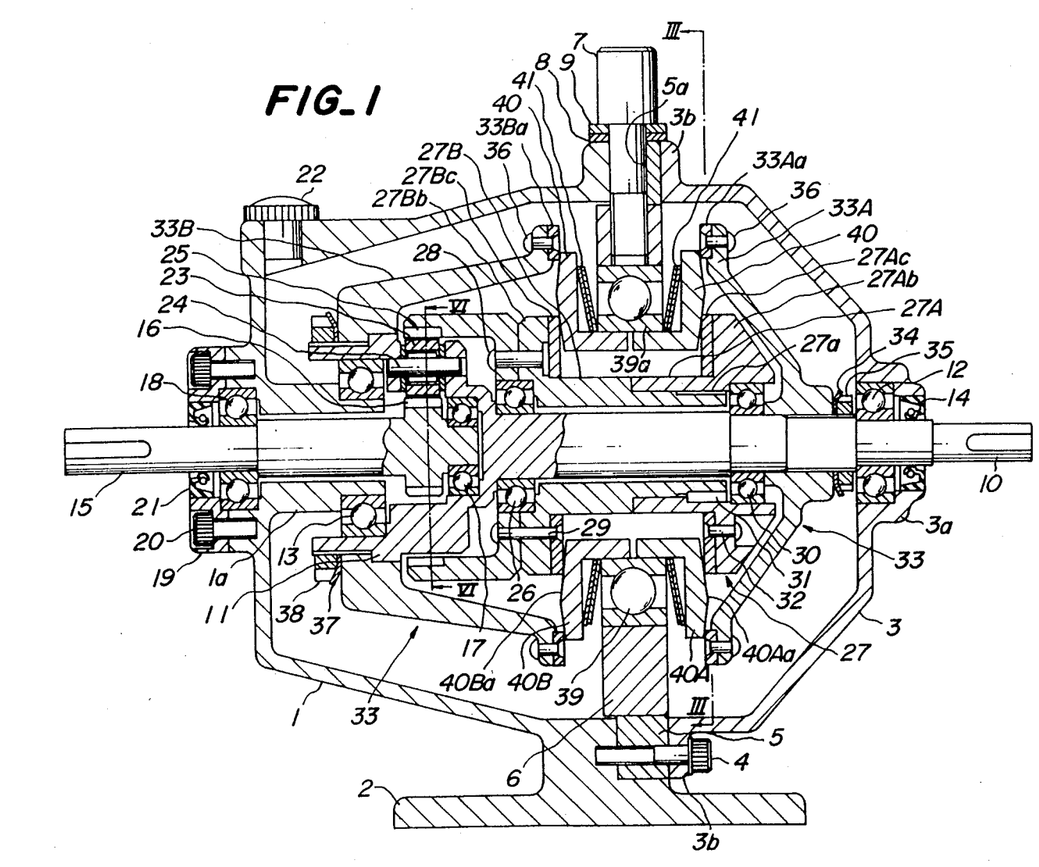
FIG. 1 is a longitudinal sectional view of a stepless speed change device of a first embodiment of the invention.

An input shaft 10 is formed integrally with a planetary carrier 11 and is rotatably supported on its input side by a bearing 12 fitted in the boss 3a of the casing cover 3 and on the planetary carrier side by a bearing 13 fitted in the boss 1a of the casing 1. Reference numeral 14 shows an oil seal.

An output shaft 15 is integrally formed on an input side with a sun gear 16. The output shaft 15 is supported with its input end by a bearing 17 in a main part of the planetary carrier 11 and with its output end by a bearing 18 in the casing 1. The bearing 18 is retained to the casing by a bearing retainer 19 having an oil seal 21. Reference numeral 22 denotes an oil cap.

Figure 6:
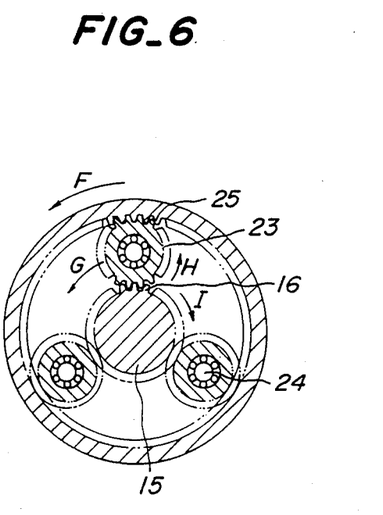
FIG. 6 is a partial sectional view of the device taken along the line VI—VI in FIG. 1.

A plurality (three in the embodiment as shown in FIG. 6) of planet gears 23 are rotatably supported on the planetary carrier 11 by means of shafts 24 so as to be in mesh with of the sun gear 16. An internal gear 25 is rotatably supported by the input shaft 10 through a bearing 26 to be in mesh with the planet gears 23.

Moreover, a driven rotor 27 in the form of a hollow cylinder having flanges at its ends is integrally connected to the internal gear 25 by means of rivets 28 and 29 and is rotatably supported by bearings 26 and 30 about the input shaft 10.

In this embodiment, the driven rotor 27 is formed by two separate members, an input side driven rotating member 27A and an output side driven rotating member 27B. These driven rotating members 27A and 27B are threadedly engaged at 27 with each other and fixed against rotation by means of a key pin 31. The driven rotating members 27A and 27B are formed with flanges 27Ab and 27Bb, respectively. Friction plates 27Ac and 27Bc are fixed to insides of the flanges 27Ab and 27Bb by means of rivets 32 and 29, respectively.

A driving rotor 33 is formed by two members 33A and 33B fixed to the input shaft 10 and the planetary carrier 11 to surround the driven rotor 27 on both sides thereof, respectively.

In more detail, the input side driving rotating member 33A substantially in the form of a dish is fixed to the input shaft 10 by means of a washer 34 and a nut 35 and is provided with a friction plate 33Aa fixed to an inside of the outer periphery of the driving rotating member 33A by means of rivets 36.

Moreover, the output side driving rotating member 33B substantially in the form of a cup is fixed to the planetary carrier 11 by means of a washer 37 and a nut 38 and is provided with a friction plate 33Ba fixed to an inside of the outer periphery of the driving rotating member 33B by means of rivets 36.

A ball bearing 39 is fitted in the eccentric ring 6. An intermediate friction transmission ring 40 is fitted in the bearing 39 between the friction plates 27Ac and 27Bc provided on the flanges 27Ab and 27Bb of the driven rotor 27 and between the friction plates 33Aa and 33Ba provided on the insides of the outer peripheries of the driving rotor 33 in a manner to establish a transmission of rotating power between the driving and driven rotors 33 and 27.

As shown in FIG. 1, the intermediate friction transmission ring 40 is formed by an input side ring 40a and an output side ring 40B having L-shaped cross-sections on one side. Outer surfaces 40Aa and 40Ba of the rings 40A and 40B are in the form of a gentle slope roof in section, respectively. Initially coned disc springs or Belleville springs 41 are interposed between an inner race 39a of the ball bearing 39 and the rings 40A and 40B.

Each of the input and output side rings 40A and 40B has an L-shaped section in a plane including a diameter on one side of the input shaft. The L-shaped section on the one side of the input shaft has a portion in parallel with the input shaft and a portion extending radially outwardly from the parallel portion. The configuration of the gentle slope roof has the following advantages. The driving and driven rotors contact the intermediate friction transmission ring in line contact so that control of rotations is exactly effected. If they did contact with each other in surface contact, circumferential speeds at the contacting surfaces would be different in positions along radial directions to make difficult the control of the rotations. Moreover, the surface contact would cause slip between the contacting surfaces resulting in internal losses. Further, when the friction plates are in contact with the surfaces of the intermediate friction ring in the form of the gentle slope roof, forces acting upon the friction ring tend to return the friction ring into the original concentric position. However, the forces are balanced by the surfaces in the form of the gentle slope roof so that the friction ring is stabilized as can be seen from FIG. 1. Moreover, the configuration of the gentle slope roof serves to maintain the intermediate friction transmission ring to be vertical to the input shaft.

The operation of the device constructed as above described according to the invention will be explained hereinafter.

Figure 2:
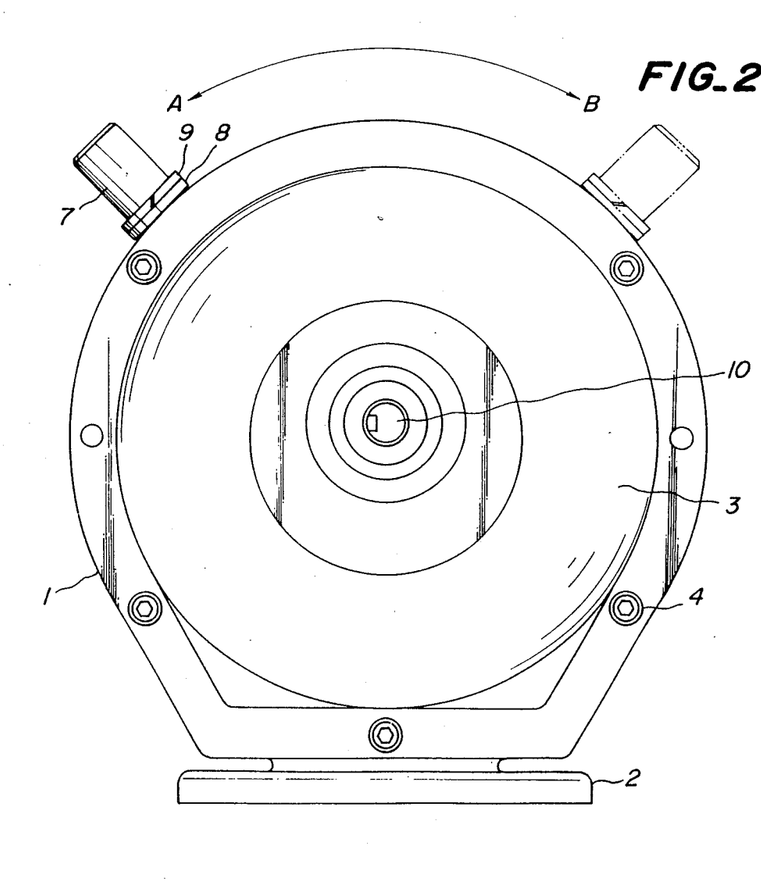
FIG. 2 is a front elevation of the device viewed from an input side.
Figure 3:
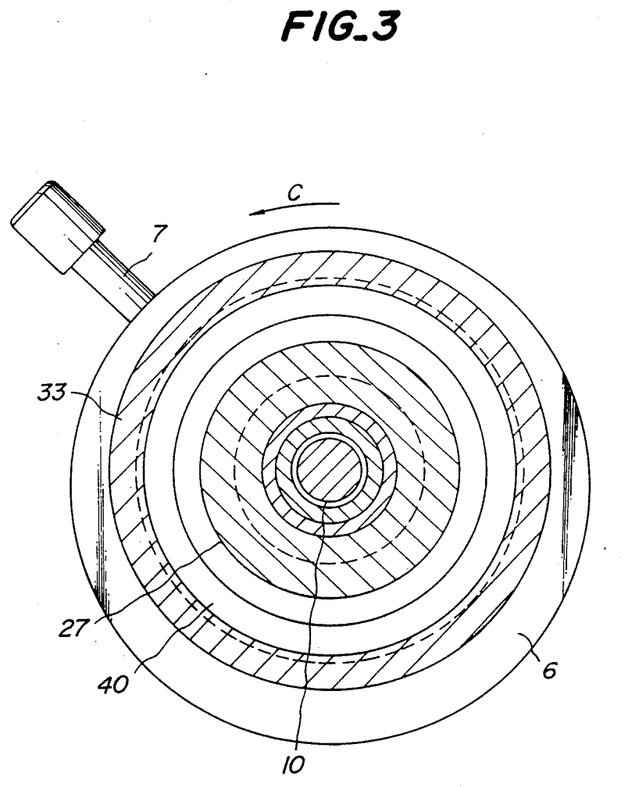
FIG. 3 is a partial sectional view taken along the line III—III in FIG. 1.

When the handle 7 is rotated in a direction shown by an arrow A in FIG. 2, the intermediate friction transmission ring 40 assumes the position shown in FIGS. 1 and 3. In this position, the intermediate friction transmission ring 40 is concentric to the driving and driven rotors 33 and 27 so that the ring 40 contact these rotors 33 and 27 with all the circumferences of the rotors. Therefore, when the driving rotor 33 is rotated, the driven rotor 27 is rotated in unison through the intermediate friction transmission ring 40 without any sliding therebetween.

Accordingly, when the input shaft 10 is rotated in a direction shown by an arrow C in FIG. 3, the driven rotor 27 is also rotated together with the input shaft 10 in the direction C through the intermediate friction transmission ring 40 so that the internal gear 25 integrally connected to the driven rotor 27 is also rotated in unison. On the other hand, the planetary carrier 11 integral with the input shaft 10 is rotated in the same manner, so that the respective planet gears 23 are revolved in unison with the input shaft 10. As a result, the sun gear 16 in mesh with these planet gears 23 is also rotated together with the output shaft 15 in unison with the input shaft 10. In this case, therefore, a rotation ratio between the input and output shafts 10 and 15 is 1:1. Such a transmission is in the fastest speed range of the stepless speed change device according to the invention.

Figure 4:
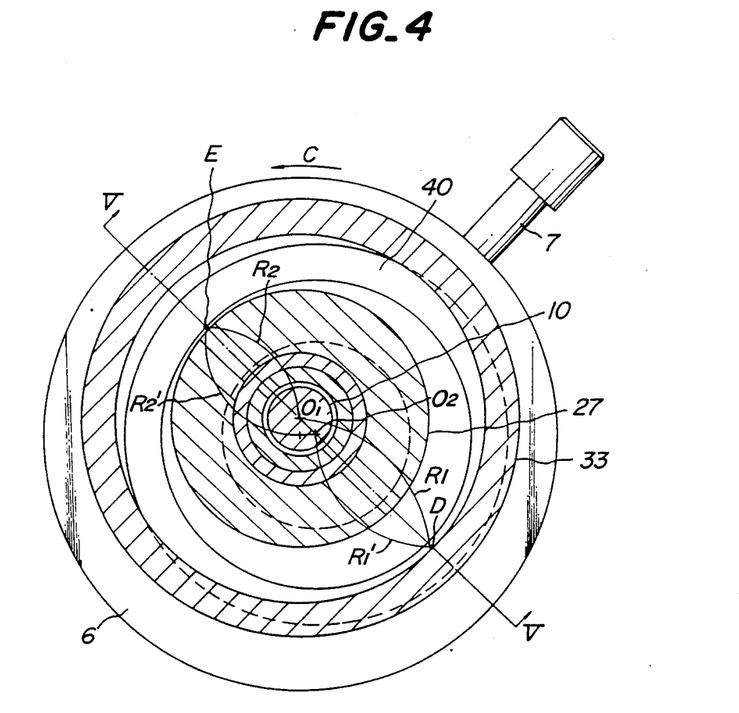
FIG. 4 is a sectional view illustrating the maximum eccentric condition of the intermediate friction transmission ring in FIG. 3.
Figure 5:
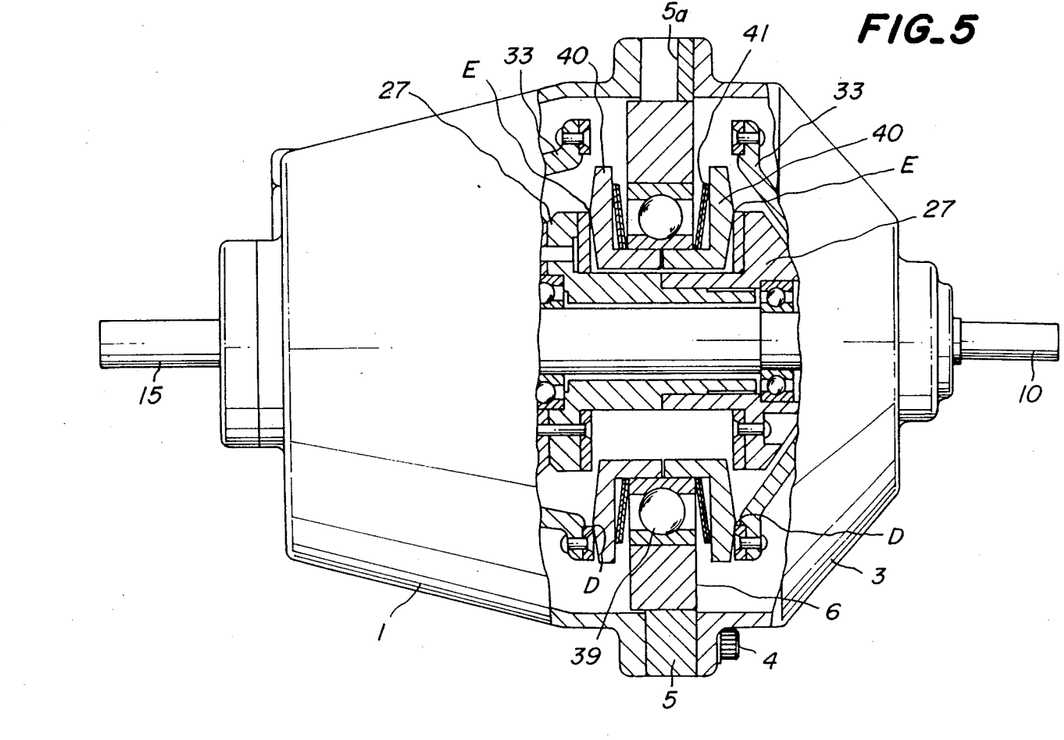
FIG. 5 is a plan view illustrating part of the device of the embodiment in section taken along the line V—V in FIG. 4.

From this fastest transmission condition, when the handle 7 is then rotated through 90° in a direction shown by an arrow B in FIG. 2, the eccentric ring 6 assumes a position shown in FIGS. 4 and 5 and therefore the intermediate friction transmission ring 40 is moved to be eccentric to the driving and driven rotors 33 and 27 as shown in FIGS. 4 and 5. As a result, contacting portions between the intermediate friction transmission ring 40 and the friction plates 33A$a$, 33B$a$ and 27A$c$, 27B$c$ on the driving and driven sides are only in the proximities of points D and E. Under such a condition, when the input shaft 10 is rotated in the direction shown by the arrow C in FIG. 4, the intermediate friction transmission ring 40 is also rotated together with the driven rotor 27 in the direction C. In this case, however, there are differences in rotating radius at the contacting points D and E between the intermediate friction transmission ring 40 and the driving and driven rotors 33 and 27.

It is assumed that $R_1$ is a radius from centers $O_1$ of the input shaft 10 and the driving and driven rotors 33 and 27 to the point D and $R_1'$ is a radius from a center $O_2$ of the intermediate friction transmission ring 40 to the point D, and further $R_2$ is a radius from the centers $O_1$ to the point E and $R_2'$ is a radius from the center $O_2$ to the point E. In this case, these radii are in a relation $R_1 > R_1'$, $R_2 < R_2'$. Therefore, the intermediate friction transmission ring 40 is rotated with an increased speed by the driving rotor 33, while the driven rotor 27 is rotated with an increased speed by the intermediate friction transmission ring 40. In other words, the rotation of the input shaft 10 is transmitted to the driven rotor 27 through the driving rotor 33 and the intermediate friction transmission ring 40 at a speed which is increased at the friction transmission portions, respectively.

In this embodiment, the respective increased transmission ratios are approximately 1.18 so that the ultimately increased transmission ratio is of the order of 1.392.

In other words, when the input shaft 10 is rotated one rotation, the driven rotor 27 is rotated about 1.392 rotation. When the driven rotor 27 is rotated at the increased speed, the internal gear 25 integral with the driven rotor 27 is rotated in a direction shown by an arrow F. On the other hand, the planetary carrier 11 integral with the input shaft 10 is also rotated in a direction shown by an arrow G at the same rotating speed as that of the input shaft 10, which is slower than the rotating speed of the internal gear 25. Accordingly, the planet gears 23 are revolved in the direction G and at the same time rotate about their axes in directions shown by an arrow H in FIG. 6 so that the sun gear 16 in mesh with the planet gears 23 is rotated at a further decreased speed.

Namely, when the planet gears 23 are rotated about their axes in the directions H and the sun gear 16 about its axis in the direction I, the sun gear 16 and the output shaft 15 are rotated in the direction G or I.

Therefore, if $G > I$, the sun gear 16 is rotated in the direction G. If $G = I$, the sun gear is not rotated. In case of $G < I$, the sun gear 16 is rotated in the direction I.

With the device of this embodiment, therefore, the driven rotor 27 is rotated at an increased speed by means of the friction transmission means, and the output shaft 15 is rotated at a speed lower than that of the input shaft 10 by means of the planetary gear. In this embodiment, the reduction ratio is about 2.5. As above mentioned, the ultimately increased transmission ratio is about 1.392. Therefore, the rotation of the output shaft 15 at the lowest speed changing condition is 2.5 times $(1.392-1)$ or $(1.392-1) \times 2.5 = 0.98$. In this case, accordingly, the rotation of the output shaft 15 is about zero.

In this invention, when the handle 7 is set an optional position between the arrows A and B in FIG. 2, stepless transmission ratios can be obtained between the top and low transmissions. Moreover, by suitably setting the speed-up ratio of the driven rotor or reduction ratio of the planetary gear, transmission ratios can be optionally set between the fastest and lowest speed ranges.

Another embodiment of the invention will be explained referring to FIGS. 7-12, wherein like components are designated by the same reference numerals as those used in the first embodiment shown in FIGS. 1-6. In order to avoid duplication of explanation, the same or substantially the same components will not be described in further detail.

Figure 7:
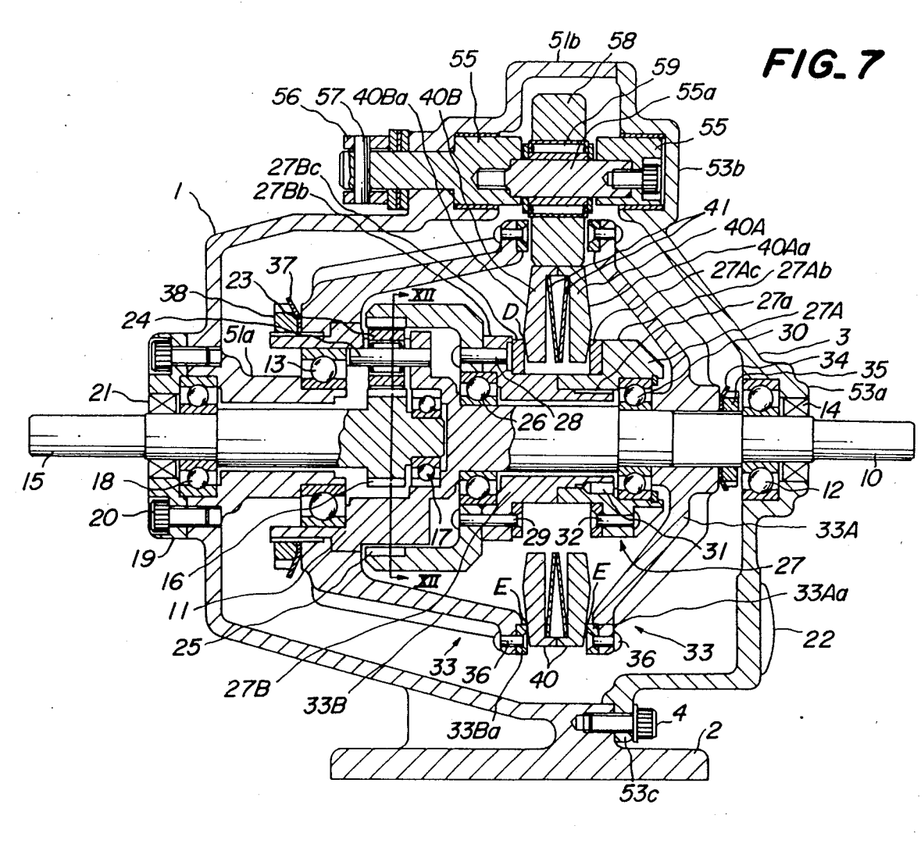
FIG. 7 is a longitudinal sectional view of a stepless speed change device of another embodiment of the invention taken along the line VII—VII in FIG. 8.

The stepless speed change device in this embodiment comprises a casing 1 substantially in the form of a hollow cylinder which is opened on an input side and has a boss 51$a$ on an output side for a shaft passing therethrough. The casing 1 is integrally formed at two locations on an upper portion of the casing with guide roller receiving portions 51$b$ in the form of vertically divided cylinders. The casing 1 is provided at its bottom portion with a base 2 formed integral with the casing 1 and is covered by a casing cover 3 clamped to the casing 1 by means of bolts 4. The casing cover 3 has a boss 53$a$ on an input side for an input shaft passing therethrough, cover portions 53$b$ for the guide roller receiving portions 51$b$ and a flange 53$c$ for clamping the casing cover 3 to the casing 1.

An eccentric shaft 55 is rotatably provided between the guide roller receiving portions 51$b$ and the cover portion 53$b$ for each of the guide rollers. The eccentric shaft 55 is provided with an eccentric portion 55$a$, and a handle 56 pivotally connected to a projection of the eccentric shaft 55 by means of a pin 57. A guide roller 58 is rotatably provided on a bearing 59 fitted on the eccentric portion 55$a$ of the eccentric shaft 55.

Instead of the eccentric ring 6 used in the first embodiment, the two guide rollers 58 are used which are arranged so as to be in contact with an intermediate friction transmission ring 40 which is substantially the same in construction as the intermediate friction transmission ring 40 in the first embodiment.

In this embodiment, each of the input and output side rings 40A and 40B has an L-shaped section in a plane including a diameter on one side of the input shaft. The L-shaped section on the one side of the input shaft has a portion in parallel with the input shaft and a portion extending radially inwardly from the parallel portion. The configuration of the gentle slope roof has the following advantages. The driving and driven rotors contact the intermediate friction transmission ring in line contact so that control of rotations is exactly effected. If they did contact with each other in surface contact, circumferential speeds at the contacting surfaces would be different in positions along radial directions to make difficult the control of the rotations. Moreover, the surface contact would cause slip between the contacting surface resulting in internal losses. Further, when the friction plates are in contact with the surfaces of the intermediate friction ring in the form of the gentle slope roof, forces acting upon the friction ring tend to return the friction ring into the original concentric position. Therefore, the forces serve to return the intermediate friction transmission ring set in an eccentric position into the concentric position. Moreover, the configuration of the gentle slope roof serves to maintain the intermediate friction transmission ring to be vertical to the input shaft.

The operation of the device constructed as above described according to the second embodiment of the invention will be explained hereinafter.

Figure 10:
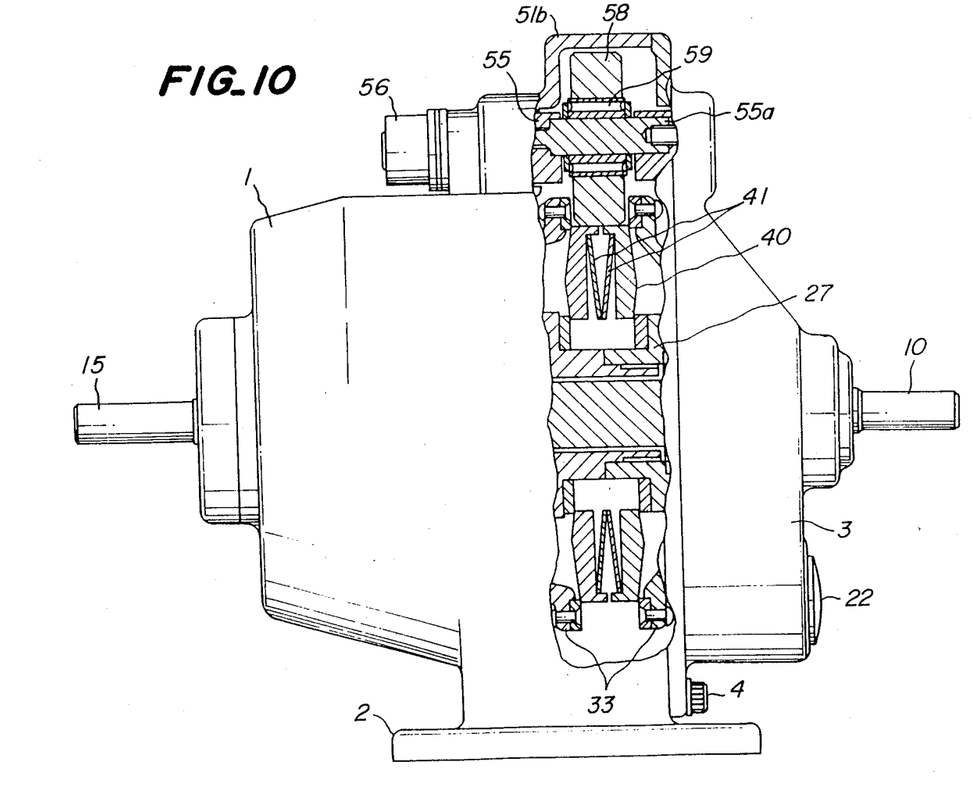
FIG. 10 is a side view showing the intermediate friction transmission ring of the device in FIG. 7 under its concentric condition.
Figure 11:
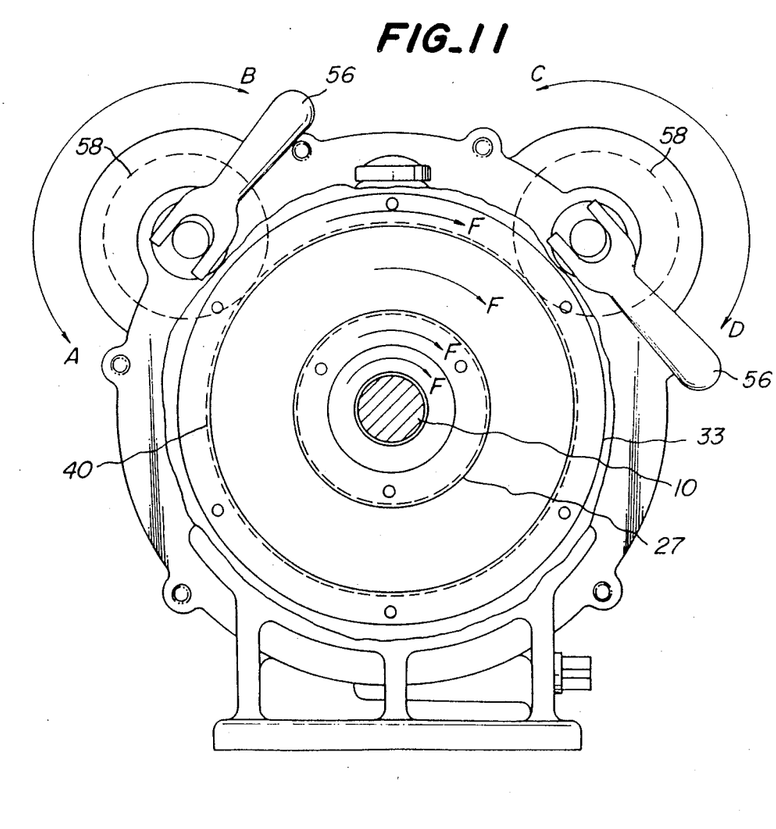
FIG. 11 is a partially removed front elevation of the intermediate friction transmission ring under the condition shown in FIG. 10.
Figure 12:
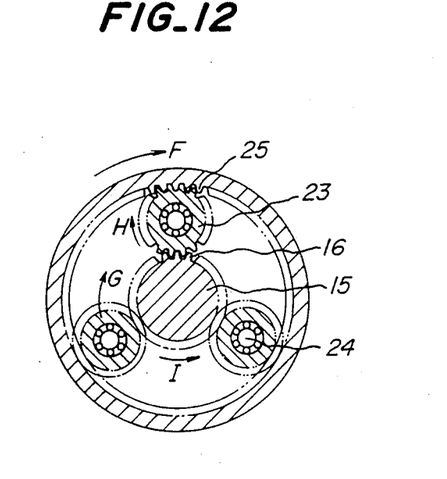
FIG. 12 is a partial sectional view taken along the line XII—XII in FIG. 7.

When the handles 56 are rotated in directions shown by arrows B and D in FIG. 11, the intermediate friction transmission ring 40 assumes the position shown in FIGS. 10 and 11. In this position, the intermediate friction transmission ring 40 is concentric to the driving and driven rotors 33 and 27 so that the ring 40 contact these rotors 33 and 27 with all the circumferences of the rotors. Therefore, when the driving rotor 33 is rotated, the driven rotor 27 is rotated in unison through the intermediate friction transmission ring 40 without any sliding therebetween.

Accordingly, when the input shaft 10 is rotated in a direction shown by an arrow C in FIG. 11, the driven rotor 27 is also rotated together with the input shaft 10 in the direction F through the intermediate friction transmission ring 40 so that the internal gear 25 integrally connected to the driven rotor 27 is also rotated in unison. On the other hand, the planetary carrier 11 integral with the input shaft 10 is rotated in the same manner, so that the respective planet gears 23 are revolved in unison with the input shaft 10. As a result, the sun gear 16 in mesh with these planet gears 23 is also rotated together with the output shaft 15 in unison with the input shaft 10. In this case, therefore, a rotation ratio between the input and output shafts 10 and 15 is 1:1. Such a transmission is in the fastest speed range of the stepless speed change device according to the invention.

Figure 8:
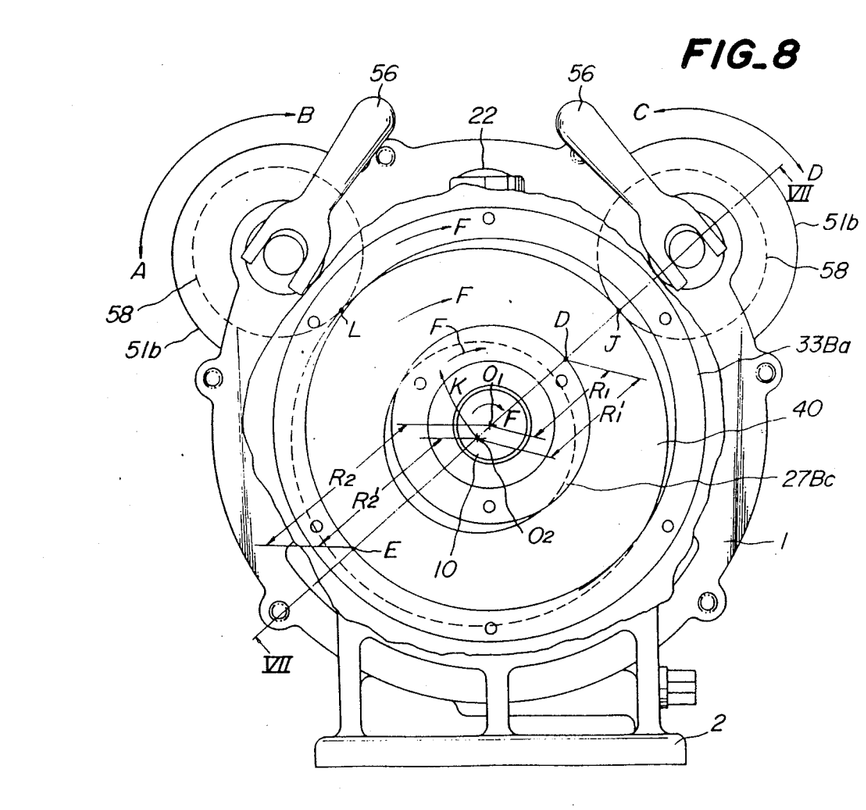
FIG. 8 is a front elevation of the device, partially removed, viewed from an output side.

From this fastest transmission condition, when the handle 56 on the right side viewed in FIG. 8 is then rotated through about 180° in a direction shown by an arrow C in FIG. 8, the guide roller 58 on the right side assumes a position shown in FIG. 8 and therefore the intermediate friction transmission ring 40 is moved to be eccentric to the driving and driven rotors 33 and 27 as shown in FIGS. 7 and 8. As a result, contact portions between the intermediate friction transmission ring 40 and the friction plates 33Aa, 33Ba and 27Ac, 27Bc on the driving and driven sides are only in the proximities of points D and E. Under such a condition, when the input shaft 10 is rotated in the direction shown by the arrow F in FIG. 8, the intermediate friction transmission ring 40 is also rotated together with the driven rotor 27 in the direction F. In this case, however, there are differences in rotating radius at the contacting points D and E between the intermediate friction transmission ring 40 and the driving and driven rotors 33 and 27.

It is assumed that $R_1$ is a radius from centers $O_1$ of the input shaft 10 and the driving and driven rotors 33 and 27 to the point D and $R_1'$ is a radius from a center $O_2$ of the intermediate friction transmission ring 40 to the point D, and further $R_2$ is a radius from the centers $O_1$ to the point E and $R_2'$ is a radius from the center $O_2$ to the point E. In this case, these radii are in a relation $R_1 < R_1'$, $R_2 > R_2'$. Therefore, the intermediate friction transmission ring 40 is rotated with an increased speed by the driving rotor 33, while the driven rotor 27 is rotated with an increased speed by the intermediate friction transmission ring 40. In other words, the rotation of the input shaft 10 is transmitted to the driven rotor 27 through the driving rotor 33 and the intermediate friction transmission ring 40 at a speed which is increased at the friction transmission portions, respectively.

In this embodiment, the respective increased transmission ratios are approximately 1.18 so that the ultimately increased transmission ratio is of the order of 1.392 in the same manner as in the first embodiment.

With the device of this embodiment, therefore, in the same manner as in the first embodiment, the driven rotor 27 is rotated at an increased speed by means of the friction transmission means, and the output shaft 15 is rotated at a speed lower than that of the input shaft 10 by means of the planetary gear. In this embodiment, the reduction ratio is about 2.5. As above mentioned, the ultimately increased transmission ratio is about 1.392. Therefore, the rotation of the output shaft 15 at the lowest speed changing condition is 2.5 times $(1.392-1)$ or $(1.392-1) \times 2.5 = 0.98$. In this case, accordingly, the rotation of the output shaft 15 is about zero.

In the second embodiment, when the handle 56 is set an optional position between the arrows C and D in FIG. 8, stepless transmission ratios can be obtained between the fastest and lowest transmissions. Moreover, by suitably setting the speed-up ratio of the driven rotor or reduction ratio of the planetary gear, transmission ratios can be optionally set between the fastest and lowest speed ranges.

The positioning of the intermediate friction transmission ring 40 by means of the guide rollers 58 will be explained herein. In case of the input shaft being rotated in the direction F in FIG. 8, the intermediate friction transmission ring 40 tends to rotate in a direction shown by an arrow K about a contacting point J between the intermediate friction transmission ring and the guide roller 58 on the right side. However, the intermediate friction transmission ring 40 can be maintained rotatable about its center $O_2$ by bringing the other guide roller 58 into contact with the intermediate friction transmission ring 40 at a point L.

Figure 9:
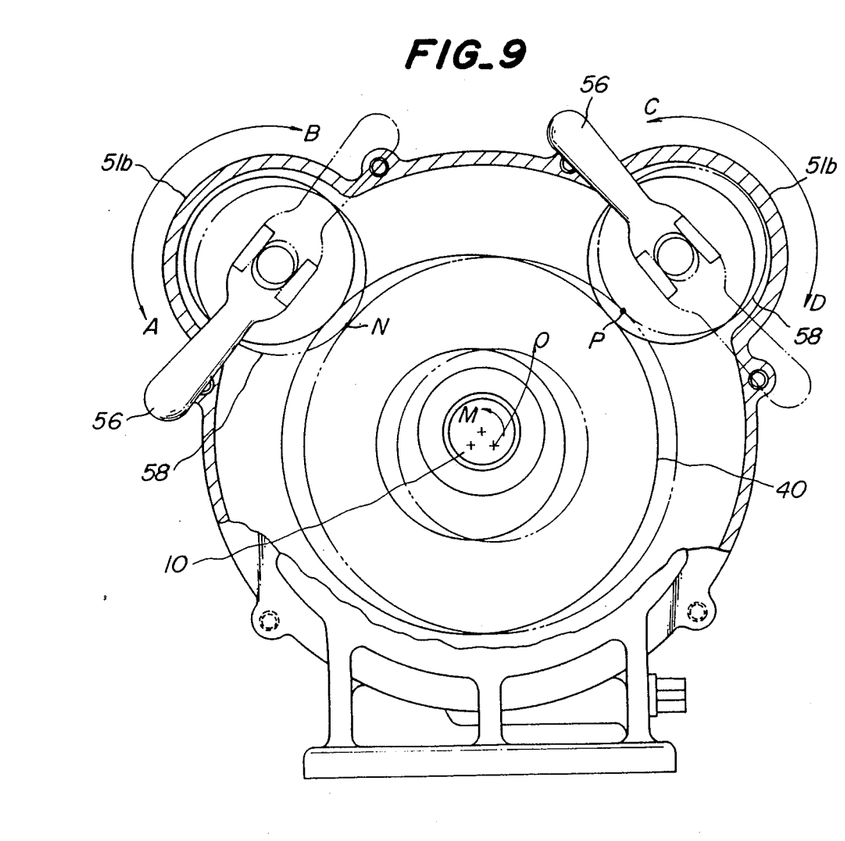
FIG. 9 is a view for explaining the operation of the device in operation of a handle.

On the other hand, in case of the input shaft being rotated in a reverse direction shown by an arrow M in FIG. 9, the speed change is effected by the operation of the handle 56 on the left side shown in FIG. 9. In this case, the intermediate friction transmission ring 40 tends to rotate in a direction shown by an arrow O about a contacting point N between the intermediate friction transmission ring and the guide roller 58 on the left side, but the rotation of the intermediate friction transmission ring 40 is made stable by bringing the other guide roller 58 into contact with the intermediate friction transmission ring 40 at a point P.

Therefore, optional transmission ratios can be obtained by operating either one of the handles 56.

As can be seen from the above explanation, according to the invention, the intermediate friction transmission ring capable of adjusting its eccentricity relative to the input shaft by the eccentric ring or two sets of guide rollers is provided between the driving rotor consisting of two members rotating together with the input shaft and the driven rotor provided rotatably relative to the driving rotor without using any conical wheels for friction transmission. The friction transmission is accomplished by engagements of these members. In the fastest speed range, since the driving and driven rotors concentrically contact the intermediate friction transmission ring, the respective rotors contact the ring with all the circumferences thereof, with the result that very high transmission efficiency approximately 100% can be obtained without slipping.

Moreover, even in speed ranges other than the fastest speed range, wherein the intermediate friction transmission ring is eccentric to the input shaft so that the driving and driven rotors partially contact the intermediate friction transmission, the ratio of pitch line diameters of the driving and driven rotors is larger than 1:2. Therefore, fairly long friction transmission lines on the pitch lines are accomplished and positive and negative slipping zones on both sides of the pitch lines become narrower. Therefore, fairly high transmission efficiency can be accomplished in the speed ranges other than the fastest speed range.

Accordingly, the invention has the advantage enabling to improve the transmission efficiency as the stepless speed change device.

Furthermore, the device according to the invention is simple in construction, easy to manufacture and light and small-sized.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A stepless speed change device having an input shaft and an output shaft, comprising a planetary carrier provided at an inner end of said input shaft, a sun gear provided at an inner end of said output shaft to be in mesh with planet gears carried on the planetary carrier, and an internal gear in mesh with the planet gears to form a planetary gear, and further comprising a driven rotor rotatable about said input shaft and in the form of a hollow cylinder having flanges at both ends and concentrically connected to said internal gear, a driving rotor enclosing said driven rotor and including two members connected to said input shaft on both sides of said driven rotor, and an intermediate friction transmission ring whose eccentricity is adjustable and interposed between said flanges of the driven rotor and between said two members of the driving rotor for transmission of rotating power therebetween.

2. A stepless speed change device as set forth in claim 1, wherein at least one guide roller means is provided on an outer side of the intermediate friction transmission ring, said guide roller means comprising an eccentric shaft having an eccentric portion, eccentric shaft rotating means for rotating the eccentric shaft from outside of the device, and a guide roller fitted on a bearing mounted on the eccentric portion of the eccentric shaft, thereby enabling the eccentricity of the intermediate friction transmission ring to adjust by rotating the eccentric shaft by said eccentric shaft rotating means.

3. A stepless speed change device as set forth in claim 2, wherein said intermediate friction transmission ring comprises an input side ring and an output side ring, whose longitudinal sectional shape in a plane including a diameter on one side of the input shaft is an L-shaped form having a portion in parallel with the input shaft and a portion extending radially inwardly from the first mentioned portion, and spring means for urging said input and output side rings away from each other in an axial direction of the input shaft.

4. A stepless speed change device as set forth in claim 1, wherein an eccentric ring has eccentric inner aperture, in which said intermediate friction transmission ring is fitted, thereby enabling the eccentricity of the intermediate friction transmission ring to adjust by rotating the eccentric ring.

5. A stepless speed change device as set forth in claim 4, wherein said intermediate friction transmission ring comprises an input side ring and an output side ring whose longitudinal sectional shape in a plane including a diameter on one side of the input shaft is an L-shaped form having a portion in parallel with the input shaft and a portion extending radially outwardly from the first mentioned portion, and spring means for urging said two members away from each other in an axial direction of the input shaft.

6. A stepless speed change device as set forth in claim 4, wherein each of surfaces of said intermediate friction transmission ring on which the driving and driven rotors contact is formed in a shape of a gentle slope roof in section.

7. A stepless speed change device as set forth in claim 4, wherein said driven rotor comprises an input side driven rotating member and an output side rotating member, and friction plates are provided on insides of both the flanges of the driven rotor.

8. A stepless speed change device as set forth in claim 4, wherein the one member of the driving rotor on the side of the input shaft is connected to the input shaft and the other member on the side of the output shaft is connected to the planetary carrier, and friction plates are provided on surfaces of both the members in opposition to the intermediate friction transmission ring.

* * * * *